000# United States Patent
Chen et al.

(10) Patent No.: US 8,033,668 B2
(45) Date of Patent: Oct. 11, 2011

(54) IMAGING DISPLACEMENT MODULE FOR INCREASING IMAGE RESOLUTION OF PROJECTION APPARATUS

(75) Inventors: Yi-Chang Chen, Hsinchu (TW); Chih-Chien Lin, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 712 days.

(21) Appl. No.: 11/856,470

(22) Filed: Sep. 17, 2007

(65) Prior Publication Data

US 2008/0304017 A1 Dec. 11, 2008

(30) Foreign Application Priority Data

Jun. 5, 2007 (TW) .............................. 96209227 U (51) Int. Cl.
*G03B 21/28* (2006.01)
*G03B 21/14* (2006.01)
(52) U.S. Cl. .......................................... 353/46; 353/50
(58) Field of Classification Search ..................... 353/46, 353/47, 48, 49, 50, 51
See application file for complete search history.

(56) References Cited

U.S. PATENT DOCUMENTS

| 5,037,173 A | * | 8/1991 | Sampsell et al. ................ 385/17 |
| 6,317,169 B1 | | 11/2001 | Smith |

FOREIGN PATENT DOCUMENTS

| TW | 200615676 | * | 5/2006 |
| TW | 200630733 | | 9/2006 |
| TW | I243276 | | 9/2007 |

* cited by examiner

*Primary Examiner* — Tony Ko
(74) *Attorney, Agent, or Firm* — J.C. Patents (57) ABSTRACT

An imaging displacement module including a frame, an optical element, a carrier, a connecting portion and at least a first actuator is provided. The frame has a first opening, and the optical element, the carrier, the connecting portion and the first actuator are all disposed in the first opening. The carrier is capable of carrying the optical element, and the connecting portion connects between the frame and the carrier and capable of generating an elastic torsion around an axis. The first actuator is disposed at a side of the carrier and capable of driving the carrier to vibrate periodically.

23 Claims, 7 Drawing Sheets

IMAGING DISPLACEMENT MODULE FOR INCREASING IMAGE RESOLUTION OF PROJECTION APPARATUS

CROSS-REFERENCE TO RELATED APPLICATION

This application claims the priority benefit of Taiwan application serial no. 96209227, filed on Jun. 5, 2007. All disclosure of the Taiwan application is incorporated herein by reference.

BACKGROUND OF THE INVENTION

1. Field of the Invention

The present invention generally relates to an imaging displacement module. More particularly, the present invention relates to an imaging displacement module capable of increasing the resolution of image.

2. Description of Related Art

In recent years, many kinds of display apparatus such as liquid crystal display (LCD) panel, plasma display panel (PDP) and projection apparatus are broadly used in daily life. In particular, projection apparatus is more suitable to display large images. Therefore, projection apparatus has gradually become an indispensable technique for displaying large images. In general, when the projection apparatus projects an image on a screen, black areas exist between the pixels of the image and appear as a net in a whole. Since the projection apparatus is mostly used for displaying large image, the user easily recognizes the net-like black areas and feels the poor display quality.

Consequently, a few conventional techniques have been developed to resolve the foregoing poor display quality problem. The conventional techniques eliminates or reduces the net-like black areas by vibrating a prism or a projection lens of an optical engine to switch the projected position of the image on the screen rapidly. However, the prism and the projection lens of the projection apparatus are heavy and bulky. Therefore, the mechanism for vibrating the prism or the projection lens is often complicated and occupies a relatively large space. As a result, the mass production of devices of vibrating the prism or the projection lens is not practical.

SUMMARY OF THE INVENTION

Accordingly, the present invention provides an imaging displacement module for switching the imaging position of a plurality of sub images within each frame time so as to improve the image quality of a projection apparatus.

As embodied and broadly described herein, one embodiment of the present invention provides an imaging displacement module that including a frame, an optical element, a carrier, a connecting portion and at least a first actuator. The frame has a first opening, and the optical element, the carrier, the connecting portion and the first actuator are disposed in the first opening. The carrier is capable of carrying the optical element, and the connecting portion connects between the frame and the carrier having an axis thereof, and the connecting portion is capable of generating an elastic torsion around the axis. The first actuator is disposed at a side of the carrier and capable of driving the carrier to vibrate periodically.

According to one embodiment of the present invention, a plane formed by the axis of the connecting portion and a mass center of the optical element is perpendicular to a surface of the optical element.

According to one embodiment of the present invention, the connecting portion includes two connecting rods respectively disposed at two sides of the carrier.

According to one embodiment of the present invention, the connecting rods are U-shaped rods or ∩-shaped rods.

According to one embodiment of the present invention, the frame, the carrier and the connecting portion are formed integrally.

According to one embodiment of the present invention, the first actuator includes a voice coil motor (VCM) or a piezoelectric ceramic (PZT).

According to one embodiment of the present invention, the imaging displacement module further includes at least a second actuator disposed in the first opening and at another side of the carrier. The second actuator together with the first actuator is capable of driving the carrier to vibrate periodically. The second actuator includes a VCM or a PZT.

According to one embodiment of the present invention, the optical element is a reflective mirror.

According to one embodiment of the present invention, the connecting portion connects to a bottom surface of the carrier, and two ends thereof respectively connect to two opposite inner surfaces of the frame.

According to one embodiment of the present invention, the imaging displacement module further includes a base. The frame is disposed on the base, and the first actuator is disposed between the carrier and the base.

According to one embodiment of the present invention, the imaging displacement module further includes a circuit board. The base also has a second opening, and the circuit board is disposed in the second opening.

According to one embodiment of the present invention, the base further has a baffle connected to an inner edge of the second opening, and a chip of the circuit board being in contact with the baffle or a thermal sink, a heat diffusion material, for example thermal grease, disposed under the baffle.

According to one embodiment of the present invention, the imaging displacement module further includes a damping material filled between the carrier and the base. The damping material is damping adhesives or foam material.

According to one embodiment of the present invention, the first actuator includes a coil and a magnet, the coil is connected to a side of the carrier and the magnet is disposed on the base and near the coil.

According to one embodiment of the present invention, the base further has an accommodating portion, and the magnet is disposed in the accommodating portion.

The present invention utilizes an actuator disposed on the carrier to vibrate an optical element around the connecting portion periodically. This arrangement provides a very steady vibration and the possibility of mass production is high.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

First Embodiment

Figure 1:
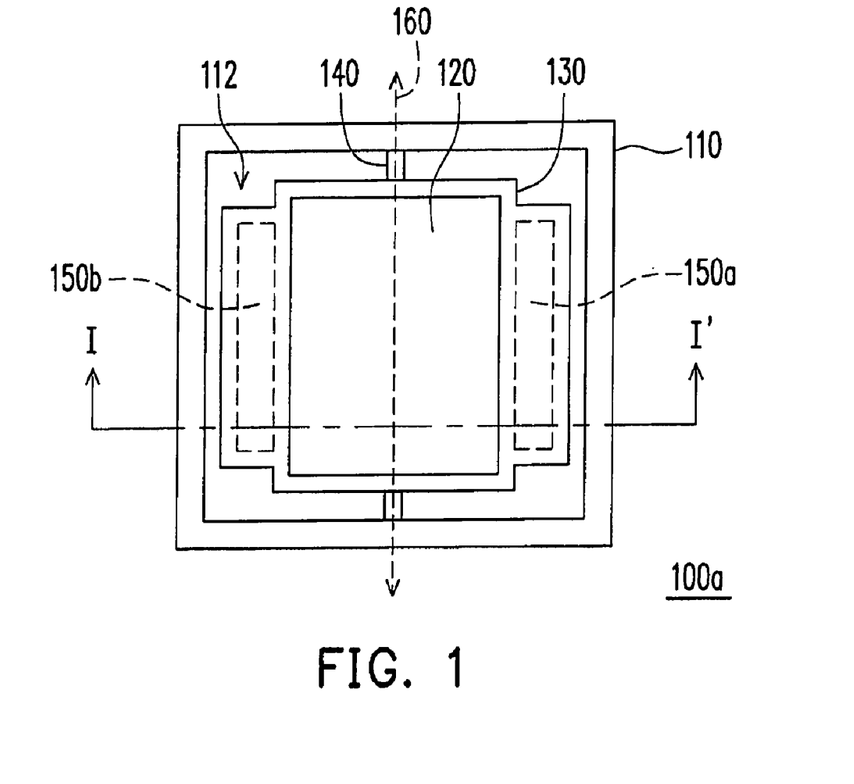
FIG. 1 is a diagram showing an imaging displacement module according to a first embodiment of the present invention.
Figure 2:
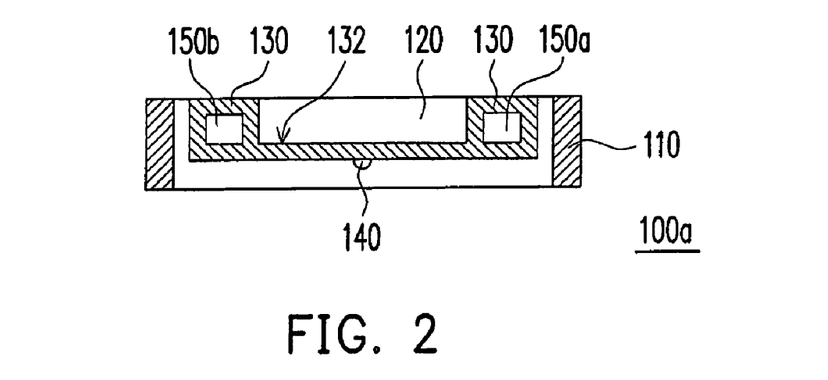
FIG. 2 is a schematic cross-sectional view along line I-I' of FIG. 1.

Refer to FIGS. 1 and 2, an imaging displacement module 100a includes a frame 110, an optical element 120, a carrier 130, a connecting portion 140 and at least a first actuator 150a. The frame 110 has a first opening 112, and the optical element 120, the carrier 130, the connecting portion 140 and the first actuator 150a are all disposed in the first opening 112. The carrier 130 is capable of carrying the optical element 120, and the connecting portion 140 connects between the frame 110 and the carrier 130 and capable of generating an elastic torsion around an axis 160. The first actuator 150a is disposed at a side of the carrier 130 and capable of driving the carrier 130 to vibrate periodically around the connecting portion 140.

In the present embodiment, a plane formed by the axis 160 of the connecting portion 140 and a mass center of the optical element 120 is perpendicular to a surface of the optical element 120. Furthermore, the optical element is a reflective mirror, for example. The carrier 130 also has a groove 132, and the optical element 120 is disposed in the groove, 132, for example. In addition, the connecting portion 140 is a rod, for example, and connects to a bottom surface of the carrier 130, and two ends thereof respectively connect to two opposite inner surfaces of the frame 110. The connecting portion 140 has the axis 160, for example. Moreover, the frame 110, the carrier 130 and the connecting portion 140 are formed integrally, for example.

In addition, the imaging displacement module 100a further includes at least a second actuator 150b disposed in the first opening 112 and at another side of the carrier 130. The second actuator 150b together with the first actuator 150a is capable of driving the carrier 130 to vibrate periodically around the connecting portion 140 so that the connecting portion 140 generates elastic torsion around the axis thereof. In the present embodiment, the imaging displacement module 100a has one first actuator 150a and one second actuator 150b. Furthermore, the first actuator 150a and the second actuator 150b are respectively disposed at two opposite sides of the carrier 130 and located outside the optical element 120. However, the numbers of first actuator 150a and the second actuator 150b of the invention are not limited in the present embodiment. The first actuator 150a and the second actuator 150b are voice coil motors (VCM) or piezoelectric ceramics (PZT), for example. The detail description that the VCMs (the first actuator 150a and the second actuator 150b) drive the carrier 130 to vibrate periodically around the connecting portion 140 will be described in subsequent embodiments.

Figure 3:
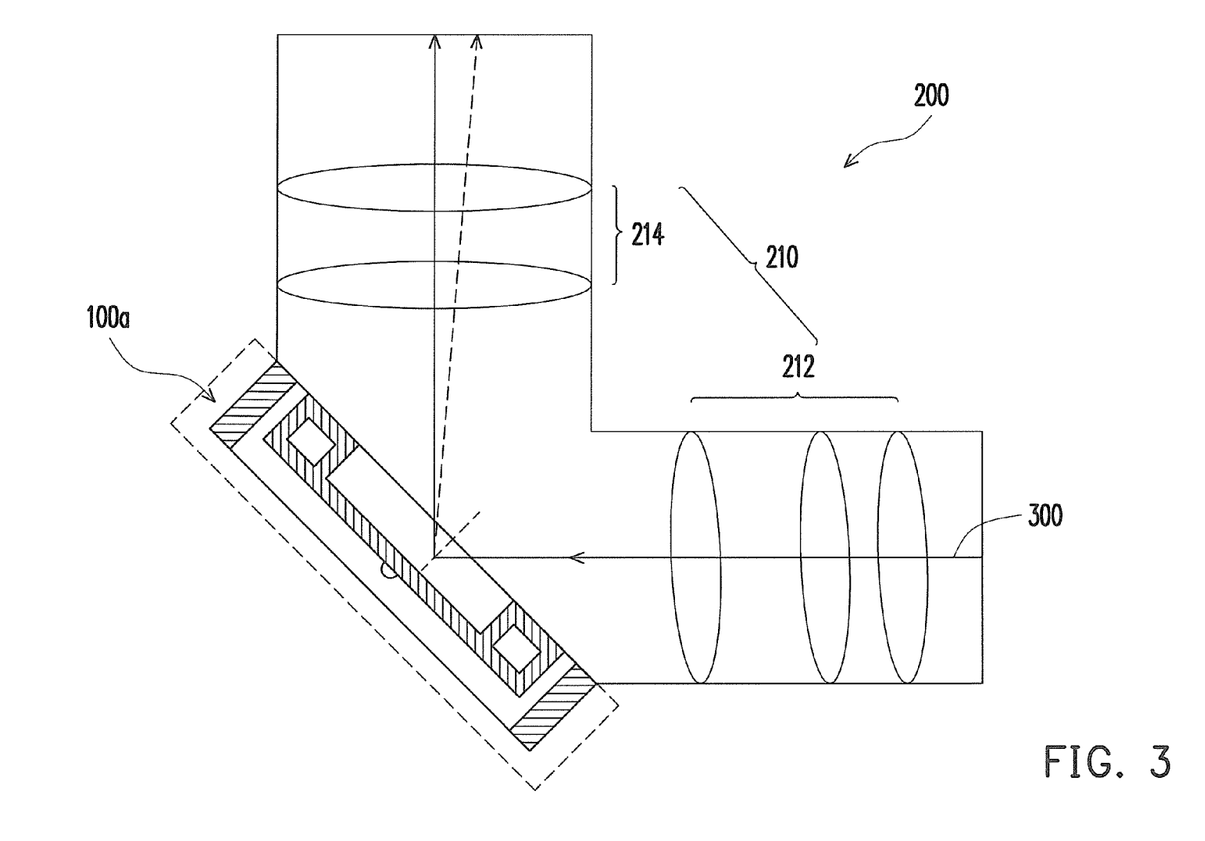
FIG. 3 is a side view of an L-type projection lens with the imaging displacement module as shown in FIG. 1.

Thereafter, as shown in FIG. 3, the imaging displacement module 100a in the present embodiment is capable of being installed inside an L-type projection lens 200 having a plurality of lenses 210. The lenses 210 are divided into a first lens group 212 and a second lens group 214. In the projection apparatus (not shown), an image light beam 300 processed by an optical engine (not shown) passes through the first lens group 212 and is reflected by the imaging displacement module 100a, and is projected onto a screen via the second lens group 214 sequentially.

In the foregoing L-type projection lens 200, the first actuator 150a and the second actuator 150b actuate the carrier 130 to vibrate periodically around the connecting portion 140 so that the image light beam 300 is reflected onto different locations of the screen by the optical element 120. Hence, net-like black areas on the screen are eliminated or reduced. Therefore, the imaging displacement module 100a improves the image display quality of the projection apparatus.

In addition, the connecting portion 140 is a connecting rod instead of the conventional bearing. Therefore, material cost of the imaging displacement module 100a is lower considerably. Furthermore, the rotating range of the carrier 130 is limited by the elastic torsion generated by the connecting portion 140 ($\theta$=M/K, wherein $\theta$ is the rotation angle, M is the torque, and K is the torsion constant of the material). Hence, there is no need to use a sensor to detect the rotation angle of the carrier 130. Therefore, the material cost of the imaging displacement module 100a is lower and the control of the imaging displacement module 100a is easier. Moreover, the frame 110, the carrier 130 and the connecting portion 140 are formed integrally. As a result, the production cost of the imaging displacement module 100a is even lower.

Furthermore, the actuators 150a and 150b are disposed at opposite sides of the carrier 130 and located outside the optical element 120. Therefore, overall thickness of the imaging displacement module 100a is smaller. Moreover, when the plane formed by the axis of the connecting portion 140 and the mass center of the optical element 120 is perpendicular to the surface of the optical element 120, the carrier 130 has a lower moment of inertia ($I=\int r^2 dm$, wherein I is the moment of inertia, r is the distance from the mass point to the rotation axis, and dm is the mass of the mass point). Because of a lower moment of inertia, a higher natural frequency ($\omega^2=K/I$, wherein $\omega$ is the natural frequency, K is the torsion constant of the material, and I is the moment of inertia) is obtained and therefore the responding speed of the carrier 130 is increased. In addition, only a smaller actuator is needed to provide a sufficient torque to the connecting portion 140 which is capable of rotating the carrier 130 to a predetermined rotation angle and consequently reducing overall volume of the imaging displacement module 100a.

Second Embodiment

Figure 4:
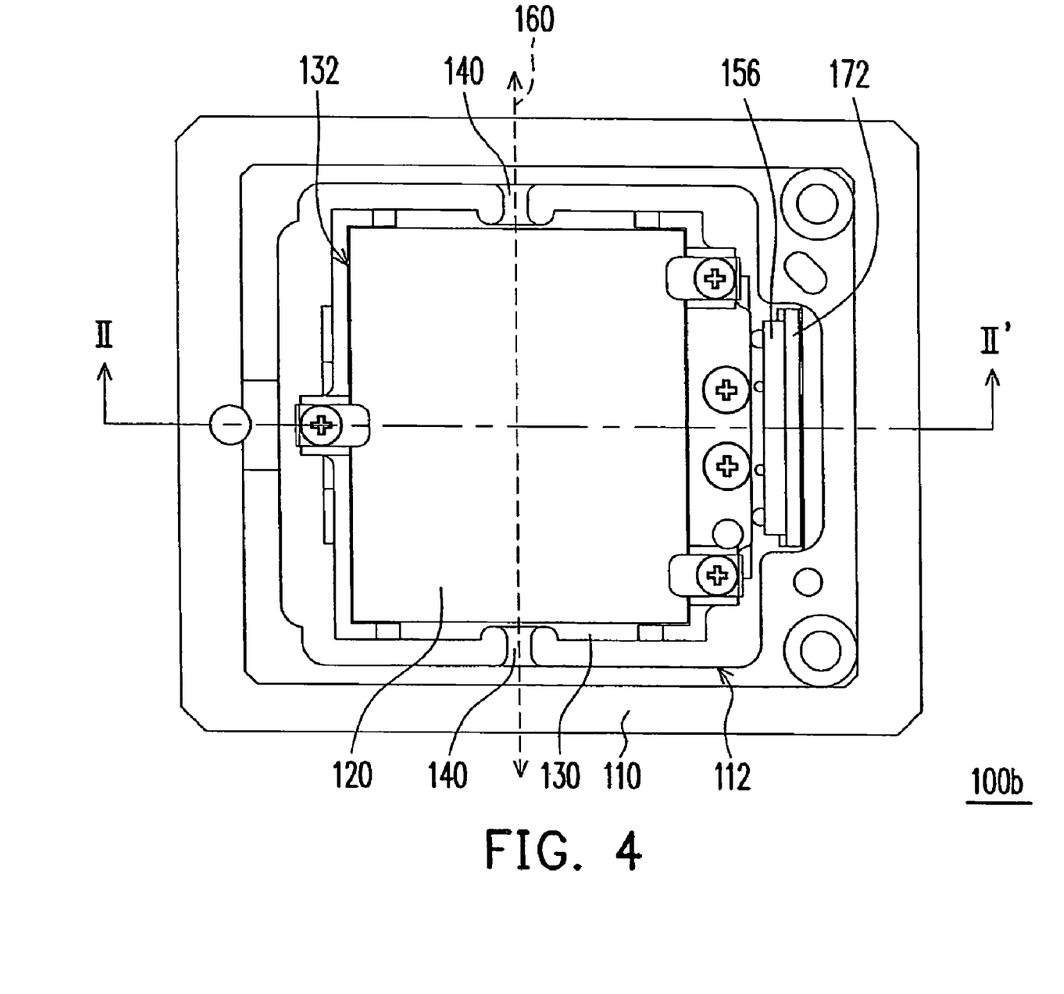
FIG. 4 is a diagram showing an imaging displacement module according to a second embodiment of the present invention.
Figure 5:
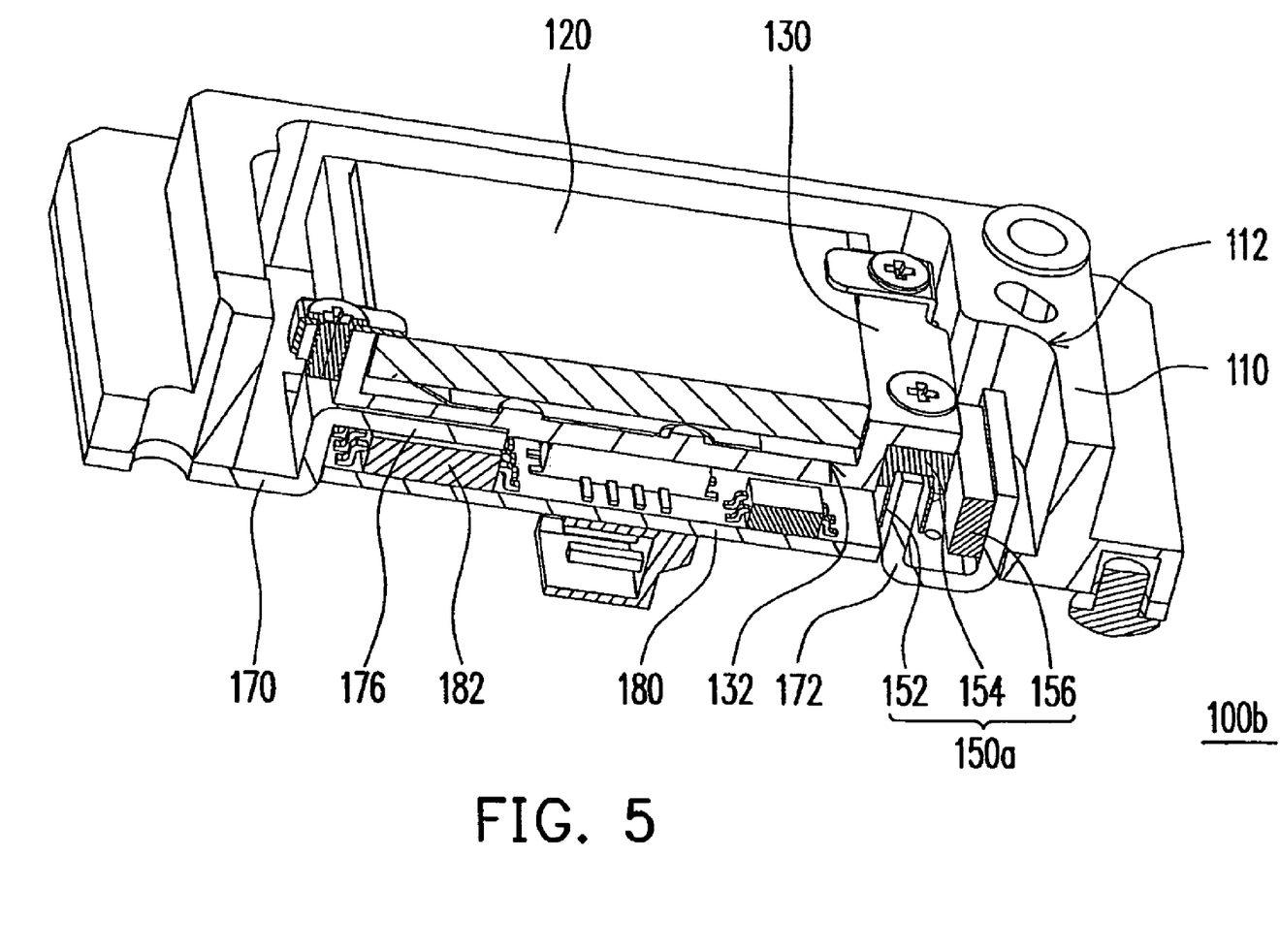
FIG. 5 is a schematic cross-sectional view along line II-II' of FIG. 4.
Figure 6:
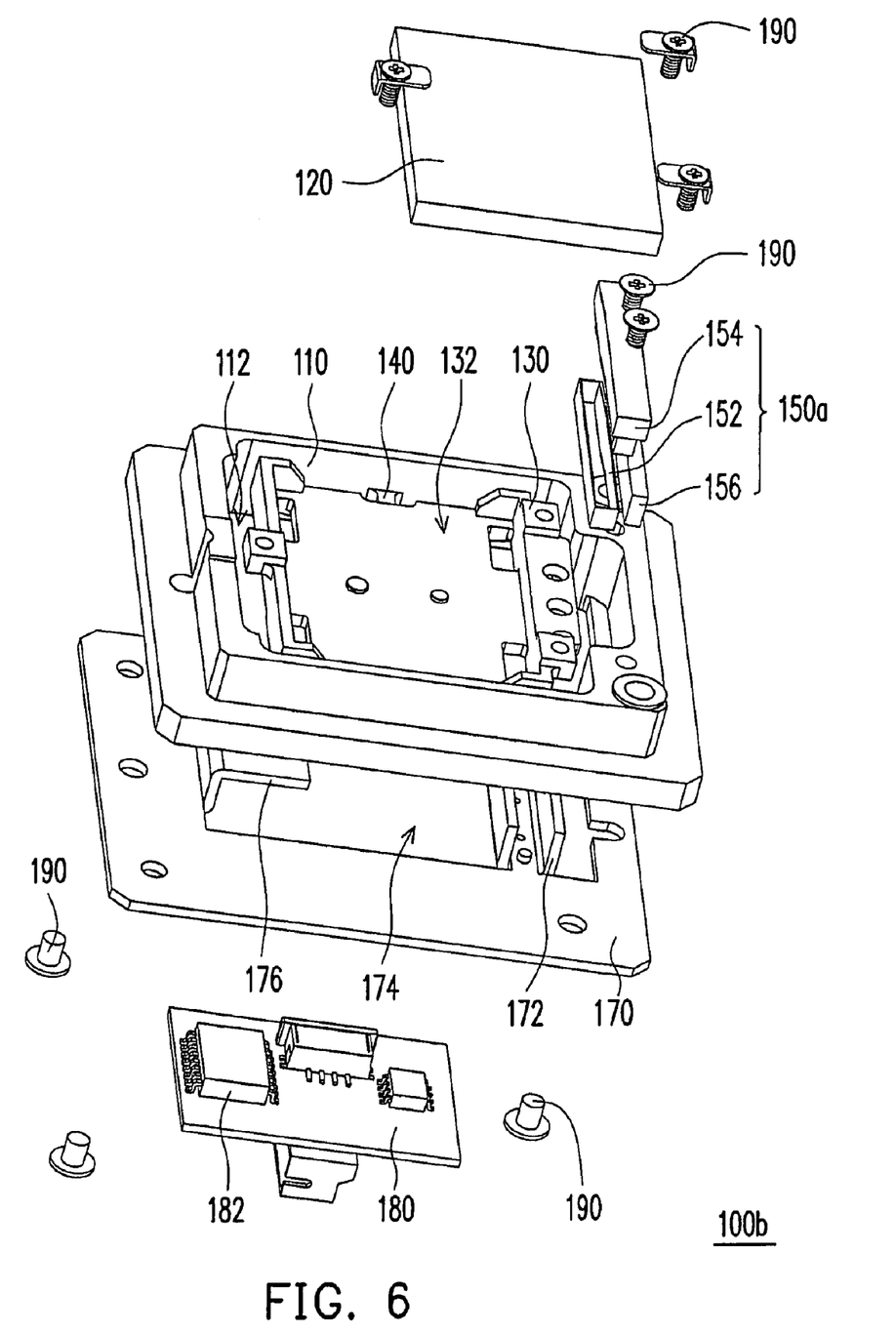
FIG. 6 is an exploded view of FIG. 4.

Refer to FIGS. 4 to 6, in the present embodiment, an imaging displacement module 100b has a structure that an connecting portion 140 thereof includes two connecting rods respectively disposed at two sides of a carrier 130. Axial lines of the connecting rods are coinciding with each other to form an axis 160 as a pivot. In addition, the imaging displacement module 100b does not include a second actuator 150b.

In the present embodiment, the imaging displacement module 100b may further includes a base 170. The frame 110 is disposed, for example, on the base 170, and the first actuator 150a is disposed, for example, between the carrier 130 and the base 170. Furthermore, the first actuator 150a is, for example, a VCM, and the first actuator 150a includes a coil 152, a coil frame 154 and a magnet 156, and the base 170 has an accommodating portion 172. The coil 152 is, for example, wrapped around the coil frame 154 and connected to a side of the carrier 130 through the coil frame 154. The magnet 156 is, for example, disposed in the accommodating portion 172. Furthermore, the accommodating portion 172 is formed in a punching process, for example.

According to the Lorentz law, when the coil 152 receives a current, the coil 152 is activated by the magnetic field of the magnet 156 to rotate the carrier 130 with an angle (not shown) around the axis of the connecting portion 140, so the connecting portion 140 generates an elastic torsion around the axis 160 of the connecting portion 140. Afterwards, when the coil 152 receives current in another direction, the coil 152 is activated by the magnetic field of the magnet 156 to rotate the carrier 130 with another angle (not shown) in the opposite direction around the axis of the connecting portion 140. Therefore, according to the present embodiment, the first actuator 150a drives the carrier 130 to vibrate periodically around the connecting portion 140 by changing the direction of the current in the coil 152 so as to generate an elastic torsion along the axis of the connecting portion 140.

In addition, the imaging displacement module 110b further includes a circuit board 180 and the base 170 further includes a second opening 174 (as shown in FIG. 6), and the circuit board 180 is disposed in the second opening 174, for example.

The circuit board 180 is capable of changing the direction and magnitude of the current in the coil 152 so as to change the rotation direction and the rotation angle of the carrier 130.

Furthermore, the base 170 further has a baffle 176 connected to the inner edge of the second opening 174, and a chip 182 of the circuit board 180 is capable of being in contact with the baffle 176 or a thermal sink disposed under the baffle 176. The baffle 176 not only prevents the circuit board 180 from being in contact with the carrier 130 during assembling, but also transfers the heat produced by the operating chip 182 to the base 170 via a heat-dissipating material such as thermal sink or thermal grease under the baffle 176, which is in contact with the chip 182. As a result, heat produced by the chip 182 is dissipated through the base 170. The baffle 176 is formed in a punching process, for example.

In addition, the imaging displacement module 100b further includes a damping material (not shown) filled between the carrier 130 and the baffle 176. The damping material isolates the vibration of the carrier 130 driven by the first actuator 150a and an external vibration of the imaging displacement module 100b. Therefore, resonance between the carrier 130 and the base 170 due to the excitation is minimized. The damping material is damping adhesives or foam material, for example. Furthermore, the imaging displacement module 100b further includes a plurality of locking elements 190. An optical element 120 is locked in a groove 132 through locking elements 190, the carrier 130 is locked on the base 170 through locking elements 190, and the coil frame 154 is also locked on the carrier 130 through locking elements 190, for example.

Third Embodiment

Figure 7:
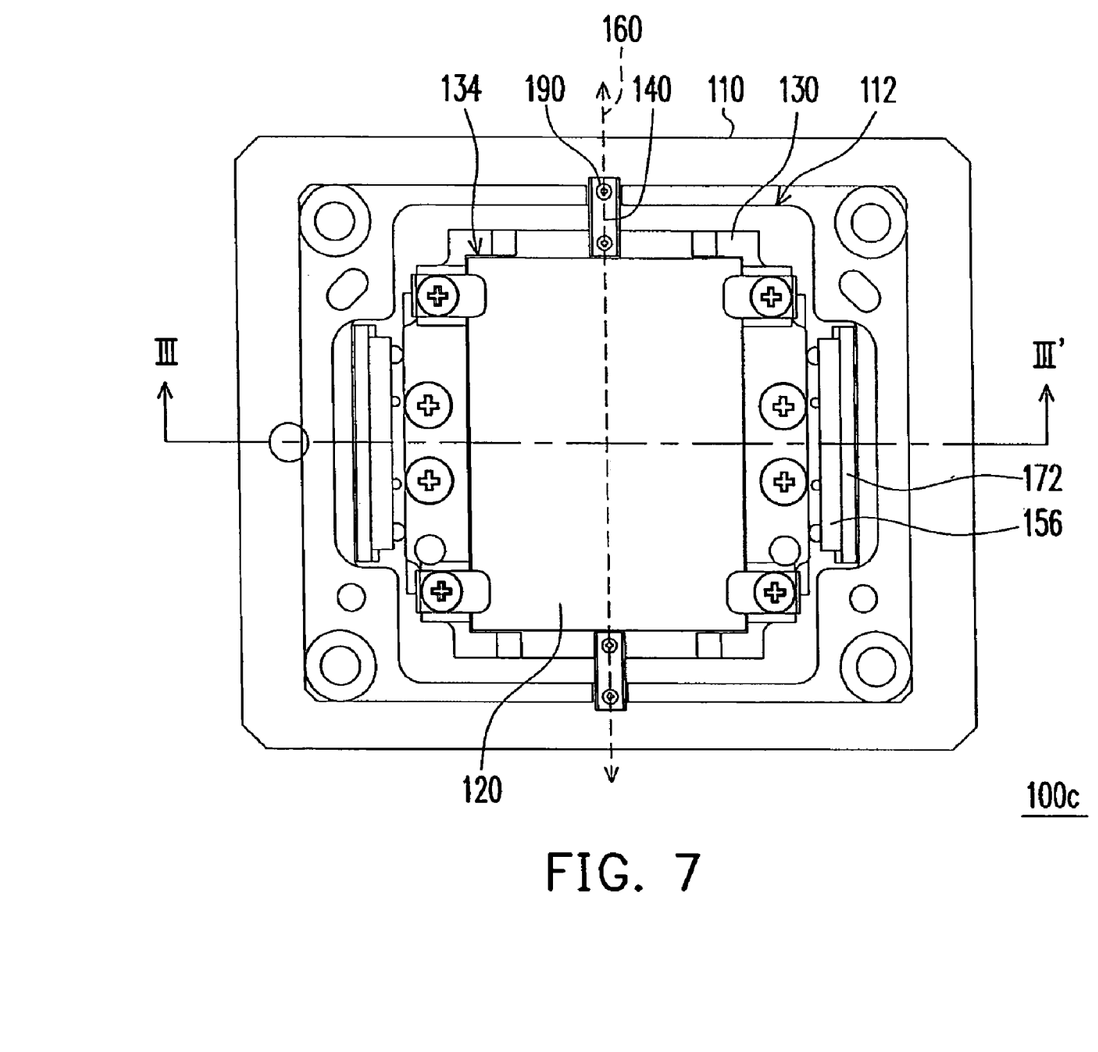
FIG. 7 is a diagram showing an imaging displacement module according to a third embodiment of the present invention.
Figure 8:
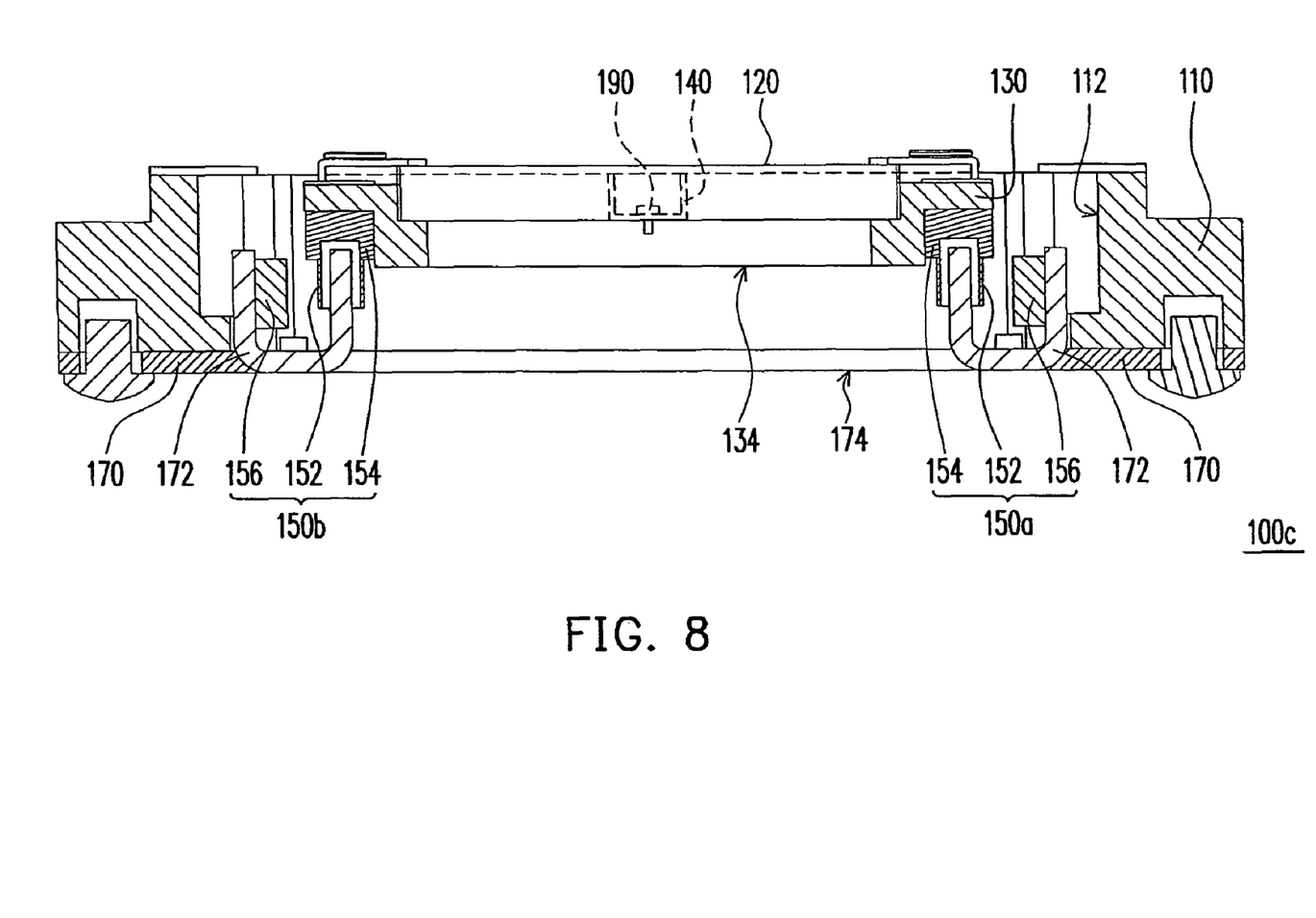
FIG. 8 is a schematic cross-sectional view along line III-III' of FIG. 7.

Refer to FIGS. 7 and 8, in the present embodiment, an imaging displacement module 100c has a structure that a connecting portion 140 includes two connecting rods respectively disposed at two sides of a carrier 130. Axial lines of the connecting rods are coinciding with each other to form an axis 160. Moreover, the connecting rods are U-shaped rods or ∩-shaped rods, for example. Furthermore, an optical element 120 is a transparent glass plate or a transparent plastic plate instead of a reflective mirror, and the carrier 130 has a third opening 134 instead of a groove 132. In addition, the optical element 120 is installed in the third opening 134, for example, so that the image light beam passes through the optical element 120.

In the present embodiment, the frame 110, the carrier 130 and the connecting portion 140 are not formed integrally. The connecting portion 140 is connected to the frame 110 and the carrier 130 through locking elements 190. It should be noted that the U-shaped rods or ∩-shaped rods have greater rigidity while bearing a lateral force than that while bearing a torque. Therefore, torsion deformation is more easily to take place than lateral bending deformation when an external force acts on the connecting portion 140. Consequently, it is much easier to rotate the carrier 130 to the predetermined rotation angle.

Similar to the second embodiment, the imaging displacement module 100c also includes a base 170. The frame 110 is disposed, for example, on the base 170, and a first actuator 150a and a second actuator 150b are disposed, for example, between the carrier 130 and the base 170. However, because the optical element 120 is a transparent glass plate or a transparent plastic plate, the second opening 174 of the base 170 must correspond to the third opening 134 of the carrier 130 to prevent the transmitting path of the image light beam from being interrupted. Similarly, a circuit board (not shown) for controlling the direction and magnitude of current in the coil 152 must not be disposed in the second opening 174 to prevent the transmitting path of the image light beam from being interrupted.

In the present embodiment, the first actuator 150a and the second actuator 150b are, for example, VCMs, and the first actuator 150a and the second actuator 150b respectively include a coil 152, a coil frame 154 and a magnet 156. The base 170 further includes two opposite accommodating portions 172. The coils 152 are wrapped around corresponding coil frames 154 and respectively connected to one of the two opposite sides of the carrier 130 through the coil frames 154, and the magnets 156 are respectively disposed on the base 170, in corresponding accommodating portions 172 and adjacent to corresponding coils 152. Similarly, the accommodating portions 172 are formed in a punching process, for example. The VCMs (the first actuator 150a and the second actuator 150b) driving the carrier 130 to vibrate periodically around the connecting portion 140 is similar to the second embodiment, and the detailed description is omitted. It should be noted from the foregoing embodiments that the imaging displacement module is capable of not only carrying a reflective mirror, but also a transparent glass plate or transparent plastic plate, so that the imaging displacement module is installed in a cylinder type projection lens having a plurality of lenses therein.

Similar to the second embodiment, the optical element 120 is locked in the groove 132 through locking elements 190, the carrier 130 is locked on the base 170 through locking elements 190, and the coil frames 154 are also locked on the carrier 130 through locking elements 190.

In summary, the imaging displacement module in the embodiments of the present invention has at least the following advantages:

1. The image light beam is reflected by or transmits through the optical element and projected onto different positions of the screen to eliminate or reduce the net-like black areas so that the quality of the image projected by the projection apparatus is improved.

2. The imaging displacement module is more stable and occupies a smaller volume by using actuators to drive the optical element disposed on the carrier to vibrate periodically around the connecting portion.

3. The material cost is lower by using the connecting rod instead of the conventional bearing.

4. There is no need to use a sensor to detect the rotation angle of the carrier. Hence, the material cost of the imaging displacement module is lower and the control of the imaging displacement module is easier.

5. The frame, the carrier and the connecting portion are formed integrally. Hence, the production cost is reduced.

6. The actuators are disposed at two opposite sides of the carrier and located outside the optical element. Hence, overall thickness of the imaging displacement module is smaller.

7. The carrier has a smaller moment of inertia. Therefore, the responding speed of the carrier is higher, and the predetermined rotation angle is obtained by using a smaller actuator. As a result, overall volume of the imaging displacement module is reduced.

8. The accommodating portion for disposing the magnet is formed in a punching process. Thus, the production cost is lower and overall thickness is reduced.

9. The circuit board is disposed in the second opening of the base so that the space of the imaging displacement module is efficiently utilized. Therefore, overall thickness is further reduced.

10. The baffle not only prevents the circuit board from being in contact with the carrier during installation, but also transfers the heat generated by an operating chip in the circuit board to the base through contact with the baffle or a thermal sink or thermal grease under the baffle. Consequently, the chip dissipates heat through the base.

11. When the actuator drives the carrier to vibrate periodically around the connecting portion, the damping material filled between the carrier and the baffle isolates the resonance vibration between the carrier and the base.

12. The connecting portion is a U-shaped rod for example so that it is easier to rotate the carrier to the predetermined rotation angle.

13. The carrier is capable of carrying not only a mirror, but also a transparent glass plate or a transparent plastic plate. Therefore, the imaging displacement module can be installed in an L-shaped projection lens or a straight cylinder type projection lens having multiple lenses.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An imaging displacement module, comprising:
a frame, having a first opening;
an optical element, disposed in the first opening;
a carrier, disposed in the first opening and capable of carrying the optical element;
a connecting portion, connecting between the frame and the carrier and having an axis thereof, the connecting portion being capable of generating an elastic torsion around the axis; and
at least a first actuator, disposed in the first opening and at a side of the carrier, the first actuator being capable of driving the carrier to vibrate periodically and comprising a voice coil motor or a piezoelectric ceramic.

2. The imaging displacement module according to claim 1, wherein a plane formed by the axis of the connecting portion and a mass center of the optical element is perpendicular to a surface of the optical element.

3. The imaging displacement module according to claim 1, wherein the connecting portion comprises two connecting rods respectively disposed at two sides of the carrier.

4. The imaging displacement module according to claim 3, wherein the connecting rods are U-shaped rods.

5. The imaging displacement module according to claim 4, wherein a material of the connecting rods comprises metal or adhesive.

6. The imaging displacement module according to claim 1, wherein the frame, the carrier and the connecting portion are formed integrally.

7. The imaging displacement module according to claim 1, further comprising at least a second actuator disposed in the first opening and at another side of the carrier, the second actuator together with the first actuator being capable of driving the carrier to vibrate periodically.

8. The imaging displacement module according to claim 1, wherein the optical element is a reflective mirror.

9. The imaging displacement module according to claim 1, wherein the connecting portion connects to a bottom surface of the carrier, and two ends of the connecting portion respectively connect to two opposite inner surfaces of the frame.

10. The imaging displacement module according to claim 1, further comprising a base, wherein the frame is disposed on the base, and the first actuator is disposed between the carrier and the base.

11. The imaging displacement module according to claim 10, further comprising a circuit board, wherein the base has a second opening, and the circuit board is disposed in the second opening.

12. The imaging displacement module according to claim 11, wherein the base further comprises a baffle connected to an inner edge of the second opening, and a chip of the circuit board is in contact with the baffle or a thermal sink or thermal grease under the baffle.

13. The imaging displacement module according to claim 1, further comprising a damping material filled between the carrier and a base.

14. The imaging displacement module according to claim 13, wherein the damping material is damping adhesive or foam material.

15. The imaging displacement module according to claim 1, wherein the first actuator comprises a coil and a magnet, the coil is connected to a side of the carrier, and the magnet is disposed on a base and adjacent to the coil.

16. The imaging displacement module according to claim 15, wherein the base further comprises an accommodating portion and the magnet is disposed in the accommodating portion.

17. An imaging displacement module, comprising:
a frame, having a first opening;
an optical element, disposed in the first opening, wherein the optical element is a transparent glass plate or a transparent plastic plate;
a carrier, having a second opening and capable of carrying the optical element;
a connecting portion, connecting between the frame and the carrier, the connecting portion being capable of generating an elastic torsion; and
at least a first actuator, disposed in the first opening and at a side of the carrier.

18. The imaging displacement module according to claim 17, wherein the connecting portion comprises two connecting rods respectively disposed at two sides of the carrier and having an axis thereof, and the connecting rods are capable of generating an elastic torsion around the axes.

19. The imaging displacement module according to claim 17, wherein the connecting portion is U-shaped rod.

20. The imaging displacement module according to claim 17, further comprising at least a second actuator disposed at another side of the carrier and capable of driving the carrier to vibrate periodically together with the first actuator.

21. The imaging displacement module according to claim 17, wherein the frame, the carrier and the connecting portion are formed integrally.

22. An imaging displacement module, comprising:
a frame, having a first opening;
an optical element, disposed in the first opening;
a carrier, disposed in the first opening and capable of carrying the optical element;
a connecting portion, connecting between the frame and the carrier and having an axis thereof, the connecting portion being capable of generating an elastic torsion around the axis; and
at least a first actuator, disposed in the first opening and at a side of the carrier, the first actuator being capable of driving the carrier to vibrate periodically, wherein the first actuator comprises a coil and a magnet, the coil is connected to a side of the carrier, and the magnet is disposed on a base and adjacent to the coil.

23. An imaging displacement module, comprising:
a frame, having a first opening;
an optical element, disposed in the first opening;
a carrier, having a second opening and capable of carrying the optical element;
a connecting portion, connecting between the frame and the carrier, the connecting portion being capable of generating an elastic torsion; and
at least a first actuator, disposed in the first opening and at a side of the carrier and comprising a voice coil motor.

* * * * *